Sept. 21, 1926.
R. C. DENNEY
CATCH DEVICE
Filed April 10, 1924
1,600,581
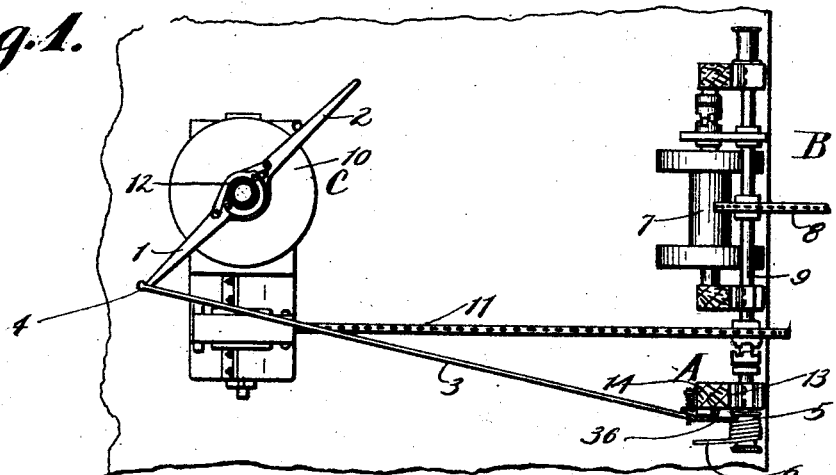
Fig. 1.
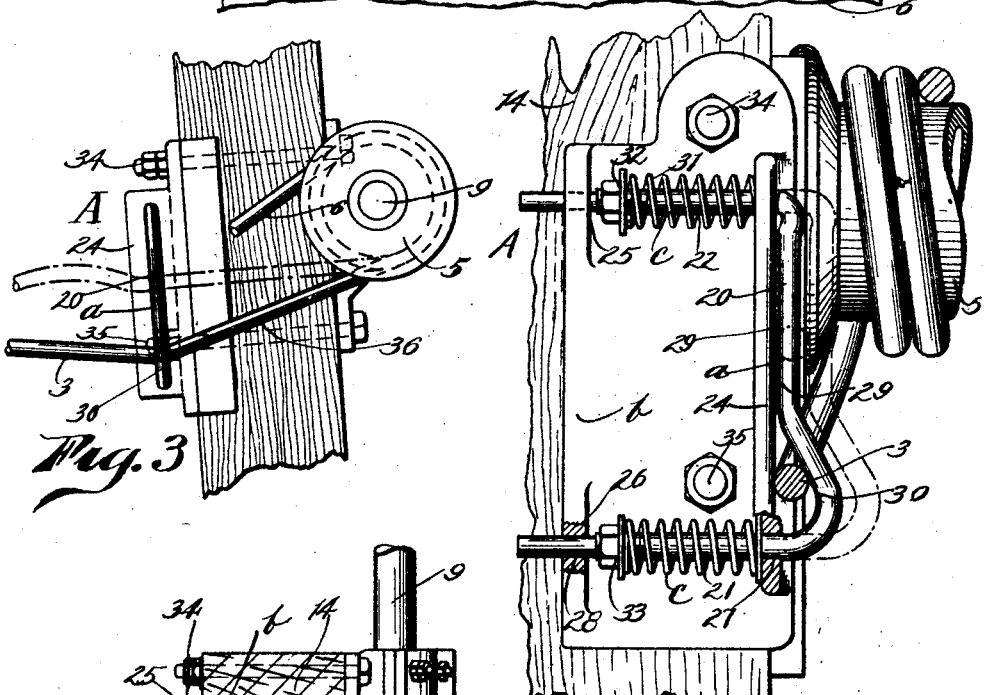
Fig. 2.
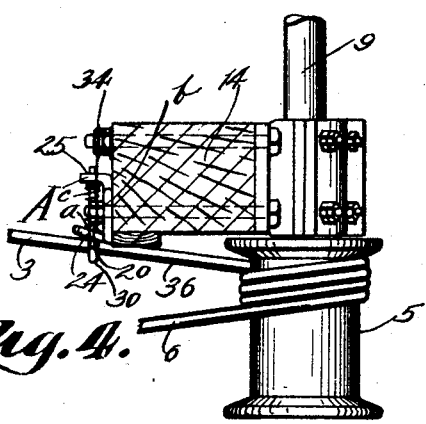
Fig. 3.
Fig. 4.
INVENTOR,
Rollie C. Denney;
BY Blakeslee & Brown
ATTORNEYS.

Patented Sept. 21, 1926.

1,600,581

UNITED STATES PATENT OFFICE.

ROLLIE C. DENNEY, OF LONG BEACH, CALIFORNIA; LOUIE E. DENNEY ADMINISTRATRIX OF THE ESTATE OF SAID ROLLIE C. DENNEY, DECEASED.

CATCH DEVICE.

Application filed April 10, 1924. Serial No. 705,514.

This invention relates to catch devices, and particularly to what may be termed a safety line catch device. The device lends itself to many adaptations, among which is use in oil well rigs, particularly where it is necessary to break strings of tubing such as used in the rotary method of drilling wells, and which tubing is broken by means of tongs. At present a rope or line is attached to an end of a tongs and the tongs is operated from what is termed a cat head, said cat head having the rope in part wound about the same and when tension is placed upon the rope the tongs is turned and the string of rotary casing or tubing is broken. Ordinarily when a casing joint is broken it breaks or yields quickly and the rope tends to slacken and to overrun the cat head so that it fouls itself and keeps pulling, often with disastrous results, in that the arm of an operator is liable to be caught by the rope and broken; or if the latch of the tongs does not open or slip the line may part and cause injury or damage to the operating mechanism. It takes a skilled operator to properly break a joint in rotary tubing with a tongs and not foul the line. Ordinarily, when skillfully handled, the wraps of the line around the cat head are thrown off when the joint breaks and the operation of the tongs ceases. If the line fouls the cat head, however, it will continue to wind up and if the tongs becomes unlatched the tongs will be drawn over and fouled on the cat head. In accordance with the present invention I provide a device which is arranged in a zone of the cat head and when the line associated with the tongs and with such cat head is in tension, there will be a tension maintained between such device and the cat head so that when the tubing is broken there will be no slack between such device and the cat head and consequently there can be no fouling of the line.

An object of the invention is to provide means whereby safety is at all times assured in the operation of any line which is adapted to be maintained in tension at a given time and slacken at other times and which line is likely to become fouled when slackened.

With the above and other objects in view, the invention consists in the novel and useful provision, formation, construction, association and relative arrangement of parts, members and features, all as shown in a certain embodiment and application in the accompanying drawing, described generally and more particularly pointed out in the claims.

In the drawing:

Figure 1 is a fragmentary plan view, parts being shown in section, of draw-works and rotary apparatus with the invention applied to certain uses in such draw-works and rotary apparatus;

Figure 2 is a fragmentary elevation on an enlarged scale, showing an application of the invention;

Figure 3 is a fragmentary front elevation and on a reduced scale from the showing of Figure 2; and Figure 4 is a fragmentary top plan view of the device, with associated elements, parts being shown in section.

Corresponding parts in all the figures are designated by the same reference characters.

Referring with particularity to the drawing the improved device is designated as an entirety and in an embodiment shown by A, and in Figure 1 I have shown an application of such device for use in connection with draw-works B and a rotary drilling outfit C. As stated, it is customary to use some form of tongs as shown at 1 and 2 for uncoupling rotary tubing during certain operation of the drilling, and it is customary to attach a line 3 to the end of the handle member of one of such tongs as shown at 4 with a portion of such line 3 coiled around a cat head 5 of the draw-works and when such draw-works is in operation and it is desired to break the rotary tubing, the operator grasps the portions 6 of such line and by increasing the tension on the wraps or coils about the cat head, the arm of the tongs 1 is drawn toward such draw-works so as to uncouple the tubing, it being understood that the other tongs 2 is either moved in a counter direction or held stationary. It may be necessary to release the coils about the cat head so that the tongs 1 may be moved backward so as to secure a new grip on the tubing to further turn the same so that it may uncouple the tubing. Usually when the uncoupling of the tubing occurs it occurs with a jerk, and as has been pointed out, unless the tongs slips properly the line receives its slack so suddenly as to foul itself and wrap rapidly about the cat head often causing great damage in that it will foul certain mechanism of the draw-works or catch an operator's arm or body and draw him over the cat head. In actual practice it has been found that many operators are killed in oil fields in southern California by such slack suddenly occurring in the line 3, and my present device, which I have designated as an entirety by A is a safety device, in that it effectively prevents any such injury occurring to an operator or to any features or mechanism of the draw-works or rotary drilling outfit. The draw-works will not be described in detail, nor will the rotary drill outfit, as the showing of Figure 1 is standard practice incorporating as the showing indicates for the draw-works the usual drum 7 with suitable drive means 8 for rotating the drum through the medium of chains or other mechanism and likewise for driving a shaft 9 to which the cat head 5 is connected. The rotary drilling outfit has the usual turn-table 10 with a connection such as a chain 11 between the draw-works and driving portions of such rotary drilling outfit for turning the turn-table. The tongs would be of the usual construction such as would grip in one direction and release when moved in a second direction about the pipe or coupling shown at 12. As is customary the draw-works is suitably supported in a frame 13 and the device A may be secured to one of the frame members as shown for instance at 14 in Figure 1. While I have shown this device associated with apparatus, as shown in Figure 1, I do not wish to confine its application simply to such showing, but wish it understood that the said device is applicable wherever a line to be used must be maintained in a given tension in order to prevent fouling of various apparatus or injury to persons and such device can be associated with hoists such as used on trucks or in derricks, cranes and such other devices as an application of the device may suggest. The device A in its simplest form comprises three means designated as $a$, $b$, and $c$. The means $a$ may consist in an elongated bent central rod or portion 20 and parallel end portions 21 and 22. The means $b$ may comprise a plate 23 provided with flanges 24, 25 and 26, and said flanges in the showing are substantially at right angles to a face of such plate 23. The flanges are bored so that the parallel end portions 21 and 22 may pass therethrough, as shown at 27 and 28 for portions of the flanges 24 and 26. The central rod 20 is formed with a part 29 adapted to bear against a portion of the surface of the flange 24 as shown in Figure 2, and likewise with a connecting looped portion 30 out of contact with the flange 24. The means $c$ may comprise a coiled spring 31 of which there may be a plurality, one for each parallel end portion 21 and 22, and each of such coiled springs is interposed between the inner surface of the flange 24 and washer and nut portions 32 and 33 carried on screw-threaded portions of the parallel end portions so that such springs will be in compression, and which would tend to draw the portion as 29 of the rod 20 in close engagement with the flange 24. The plate 23 in the adaptation of the invention to rotary apparatus as shown in Figure 1 may be provided with bores so that bolts 34 and 35 may be passed through such plate and secured to the frame member 14 of the draw-works. The device A considered as an entirety is so secured to such frame in the adaptation shown in Figure 1 that the line 3 will when not in tension be within the looped portion 30 of the rod 20. The line will stay within such looped portion and be slack until tension is exerted upon the coils surrounding the cat head, whereupon the line will move and be frictionally engaged between the portion 29 of the rod 20 and the face of the flange 24, as shown by dotted lines in Figure 2. When this occurs the zone of the line, as shown at 36 between such device A and the cat head will be in tension and when the casing or tubing is broken at the coupling all slack will occur between the end of the tongs, as 1, and such device A, but there will be no slack between such device and the cat head. It is therefore evident that there is no opportunity given such line to foul itself about any of the working apparatus of the draw-works. The frictional gripping of the line may be readily regulated by the means $c$. When the line is again slack it may be slipped into the looped portion, shown at 30 so that it may be moved freely.

It is obvious that various changes and modifications and variations may be made in practicing the invention, in departure from the particular showing of the drawing, without departing from the true spirit of the invention.

Having thus disclosed my invention, I claim and desire to secure by Letters Patent:

1. A work-line safety device for oil well equipment, comprising in combination with a power propelled rotary drum and the line convoluted thereabout and connected to the work, of line engaging means located between the drum and the work for yieldingly gripping and holding the line thereby to prevent the same from fouling the drum when the end connected to the work is quickly released.

2. A work-line safety device for oil well equipment comprising in combination with a power propelled rotary cat head and the line convoluted thereabout and connected to the work, of line engaging means located adjacent the cat head between the same and the work for yieldingly gripping and holding the line when the same is taut.

3. A work-line safety device for oil well equipment, comprising in combination with a power propelled rotary cat head and the line convoluted thereabout and connected to the work, of line engaging means located between the cat head and the work, said means including a resiliently mounted clamping member including a looped portion for permitting free passage of the line and also including a clamping arm adapted to grip the line when the same is drawn out of the loop.

4. A work-line safety device for oil well equipment, comprising in combination with a power propelled rotary cat head and the line convoluted thereabout and connected to the work, of line engaging means located between the cat head and the work, said means including a resiliently mounted clamping member bent to provide a loop portion and a relatively flat clamping arm portion co-operating with a flange, said loop portion being located in a plane beneath the cat head and the clamping arm portion being located in a plane intersecting the lower line engaging surface of the cat head, whereby when the line is slack it may pass through the loop and when the same is drawn taut it will be yieldingly gripped by the clamping arm portion.

5. A work-line safety device for oil well equipment comprising in combination with a power propelled rotary cat head and the line convoluted thereabout and connected to the work, of a line gripping device located adjacent the cat head between the same and the work and comprising a supporting plate, a flange formed from the plate and having openings, a line gripping member consisting of a line controlling portion paralleling the flange and the end portions bent at an angle thereto and projecting through said openings in the flange, springs on the end portions of said line controlling member for drawing the same toward the face of said flange.

6. A work-line safety device for oil well equipment comprising in combination with a power propelled rotary cat head and the line covoluted thereabout and connected to the work, of a line gripping device located adjacent the cat head between the same and the work and comprising a supporting plate, a flange formed from the plate and having openings, a line gripping member consisting of a line controlling portion paralleling the flange and also having end portions bent at an angle thereto and projecting through said openings in the flange, springs on the ends of said line controlling member for drawing the same toward the face of said flange, the said line controlling portion having its lower end bent outwardly from the flange to provide a line guiding loop through which the line may freely slide, and the upper end thereof being held in close contact with the flange and adapted to yieldingly grip the line when the latter is forced between the same and the flange.

7. A work-line safety device for oil well equipment comprising in combination with a power propelled rotary cat head and the line convoluted thereabout and connected with the work, of a line tensioning member located between the cat head and the work and having means for automatically gripping the line when the same is drawn taut and also having means for freely guiding the line when it is slack.

8. A work-line safety device for oil well equipment, comprising in combination with a power propelled rotary cat head and the line convoluted thereabout and connected to the work, of a supporting plate formed with an offset vertical flange provided with openings, and a line clamping member of substantially U-shaped formation having the arms thereof projecting through the openings of the flange and fitted with springs for drawing the connecting portion between the arms toward the flange, and said connecting portion including a clamping arm adapted to engage with the flange and an offset portion adjacent one arm forming a slack line receiving loop.

In testimony whereof, I have signed my name to this specification.

ROLLIE C. DENNEY.